United States Patent [19]
Khinsky et al.

[11] Patent Number: 5,737,918
[45] Date of Patent: Apr. 14, 1998

[54] APPARATUS FOR CLEANING EXHAUST GASES OF SOLID PARTICLES, DESIGN OF A UNIT FOR NEUTRALIZING HARMFUL GASEOUS EMISSIONS AND A METHOD FOR THE MANUFACTURE OF THIS UNIT

[75] Inventors: Alexandr Pavlovich Khinsky; Boris Vladimirovich Farmakovsky; Tatyana Sergeevna Vinogradova; Mikhail Ivanovich Anisimov, all of St-Petersburg, Russian Federation

[73] Assignee: Joint Stock Commercial Bank "Petrovsky", St. Petersburg, Russian Federation

[21] Appl. No.: 676,259

[22] PCT Filed: Dec. 28, 1994

[86] PCT No.: PCT/RU94/00302

§ 371 Date: Aug. 23, 1996

§ 102(e) Date: Aug. 23, 1996

[87] PCT Pub. No.: WO95/19494

PCT Pub. Date: Jul. 20, 1995

[30] Foreign Application Priority Data

Jan. 17, 1994 [RU] Russian Federation ............ 94001661
Jan. 17, 1994 [RU] Russian Federation ............ 94002467

[51] Int. Cl.$^6$ ........................................... F01N 3/28
[52] U.S. Cl. ...................... 60/297; 60/299; 422/176
[58] Field of Search ............. 60/297, 274, 299; 422/176

[56] References Cited

U.S. PATENT DOCUMENTS 3,061,416 10/1962 Kazokas ............................... 60/297
4,188,309 2/1980 Volker ................................... 60/302
5,067,319 11/1991 Moser ................................... 60/297
5,302,355 4/1994 Fujikura ................................ 60/299

FOREIGN PATENT DOCUMENTS 4207005 9/1992 Germany ................................ 60/297

*Primary Examiner*—Douglas Hart
*Attorney, Agent, or Firm*—Gary M. Nath; Nath & Associates

[57] ABSTRACT

An apparatus for cleaning exhaust gases of solid particles comprises a rotational combustion chamber (1), a swirler (2) and a soot collector (3) separated from one another by a separating cavity (7) and located on the same axis downstream the gas flow. A catalytic unit (4) for neutralizing harmful gaseous emissions is arranged coaxially inside the soot collector (3). The apparatus is provided with an inlet pipe (8) and an outlet pipe (9). The swirler is made in the form of an impeller. The unit (4) for neutralizing harmful gaseous emissions is made in the form of a cylindrical body (5) comprising longitudinal channels (6) with a catalytically active internal layer applied-thereto. The longitudinal channels (6) have a curvilinear closed-type shape in their cross-section and the catalytically active layer has the same thickness over the entire internal surface of the longitudinal channels (6), which thickness is uniform both over the cross-section of the unit (4) and throughout its length. A method for the manufacture of the unit (4) is based upon obtaining a catalytically active layer on the basis of modified alumina on the surface of a carrier. The catalytic layer is applied by a flame spraying to a flat metallic band carrier. Catalytically inactive substances are used as initial material for flame spraying. Longitudinal channels (6) are formed by corrugating the carrier across its length after the catalytically active layer is applied to it. The band is rolled in parallel with the corrugations so that the catalytically active layer is placed inside the channels (6). Air or other mixture containing oxygen is used as a gas to form plasma during spraying.

3 Claims, 1 Drawing Sheet

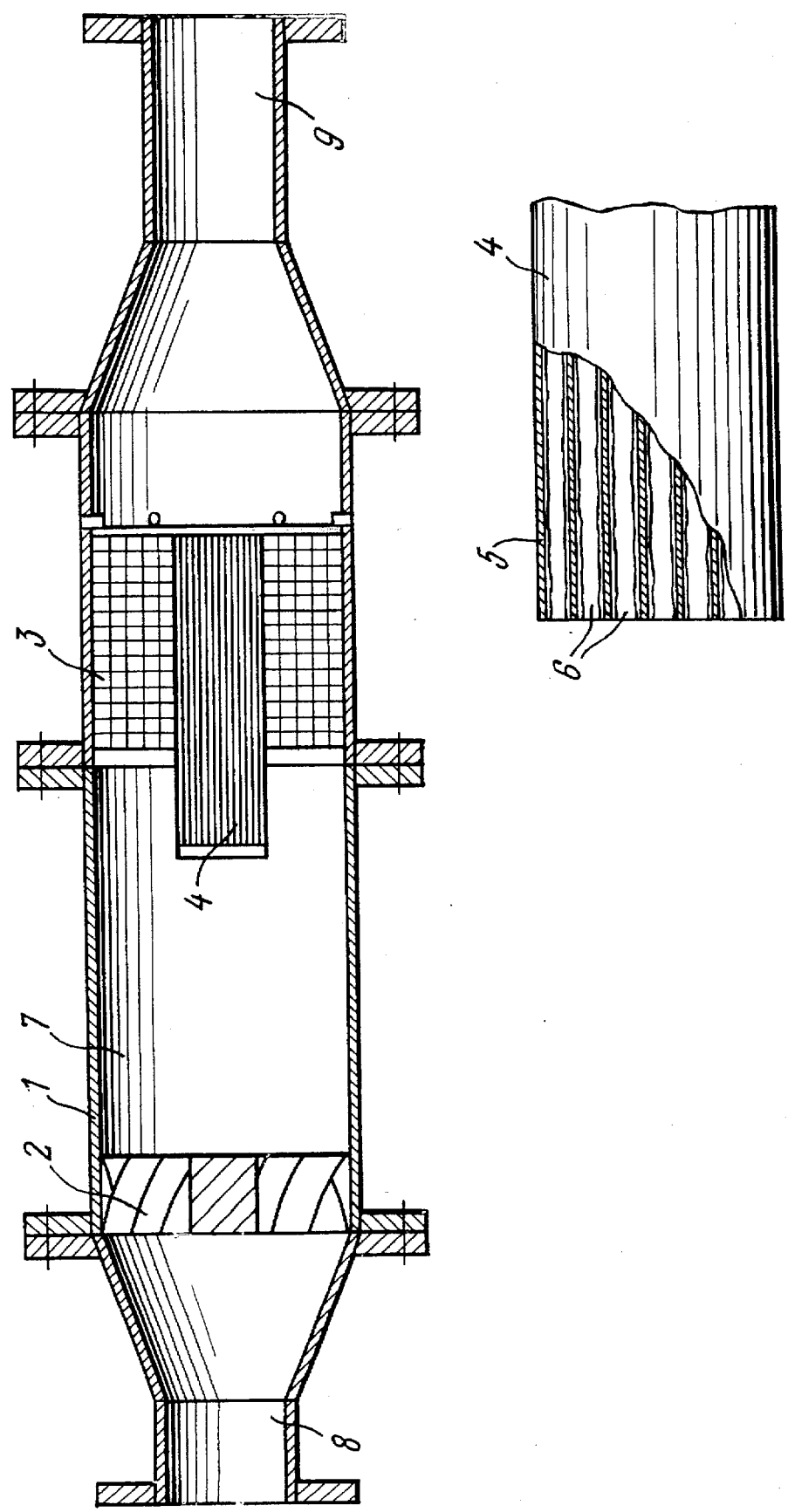

APPARATUS FOR CLEANING EXHAUST GASES OF SOLID PARTICLES, DESIGN OF A UNIT FOR NEUTRALIZING HARMFUL GASEOUS EMISSIONS AND A METHOD FOR THE MANUFACTURE OF THIS UNIT

FIELD OF THE INVENTION

The invention relates to the field of engineering industry and more particularly, automotive industry and namely: to exhaust apparatus provided with means for cleaning exhaust gases of solid particles, for instance, soot.

STATE OF PRIOR ART

The state of prior art is featured by the following apparatus. Mercedes-Benz apparatus are shown to be used for retaining solid particles ("Prospects for Saving Energy and Ecological Influence of Internal Combustion Engines". Express-Information. Issue "Ecological Problems on Transport" No. 32, 1992, pp. 24–25, FIG. 12). These apparatus are made in the form of special filters in which a winding of ceramic filaments or porous walls retain solid particles. Such filters allow to ensure a substantial vehicle run (up to 100 km) without burning the particles that have clogged the filter. Subsequently the filter, when clogged up, undergoes regeneration or is thrown away.

An apparatus is known to be used for afterburning of solid particles contained in exhaust gases of an internal combustion engine (DE, C, 3734197, 1989). This apparatus comprises a rotational combustion chamber in which a catalytic afterburning apparatus (filter) is installed to separate the combustion chamber into a space upstream the filter and a space downstream the filter. Upstream the combustion chamber an igniter is mounted that is connected thereto through a tangentially located hole. The catalytic unit is made of a ceramic monolith with axial through-holes. This apparatus of prior art knowledge allows to clean exhaust gases of solid particles.

A method is known to be used for producing a catalyst for cleaning exhaust gases (JP, B 3-34367, 22.05.91).

According to this method for applying coatings, a liquid composition is obtained from an activated alumina powder, cerium, powdered. ceria, and zirconium. The composition thus obtained is applied to the surface of a monolith base of carrier, whereupon a catalytic component of noble metal is applied thereto.

A method is known to be used for producing a catalyst for cleaning exhaust gases (JP, A, 2-17943, 22.01.92). According to this method, a suspension is prepared from a powdered mixture of vanadium oxide and alumina in a predetermined proportion according to prescribed technology. Then a carrier is submerged into the suspension thus prepared, whereupon it is dried up and calcinated in order to form an oxide surface layer on it, and after this a catalytically active metal—platinum, rhodium and/or palladium—is precipitated on the carrier thus coated.

A method is also known to be used for the manufacture of catalytic units for neutralizing harmful gases (EP. A 0203525 22.05.1986). according to this method, a catalytic composition containing alumina and ceria is applied to a monolyth honeycombed carrier by precipitation.

The composition is produced by impregnating a water insoluble cerium compound with at least one substance of the group consisting of water soluble aluminum compounds and alumina hydrates, and by calcinating the impregnation product followed by applying thereto at least one noble metal of the group consisting of platinum, palladium and rhodium.

The known methods allow to produce a carrier having a large free surface of over 100 $m^2/g$, thus ensuring high catalytic activity of such carriers.

DISCLOSURE OF THE INVENTION

The Applicant challenges the problem of creating a cleaning systems which, simultaneously with cleaning exhaust gases of solid particles, such as soot, would ensure neutralizing harmful gaseous emissions in order to improve ecology of the air atmosphere. Also, the neutralizing unit of such a system must, in the process of oxidizing soot particles, produce a reducing gas which neutralizes ecologically harmful nitrogen oxides. Besides, the catalytically active layer of the neutralizing unit must have high adhesive strength at relatively inexpensive production of such a unit.

This problem is solved owing to that the apparatus for cleaning exhaust gases of solid particles, comprising a rotational combustion chamber and a catalytic unit arranged therein, further comprises a swirler and a soot collector separated from one another by a cylindrical separating cavity and located on the same axis downstream the gas flow, and a catalytic unit for neutralizing harmful gaseous emissions is arranged coaxially inside the soot collector. The swirler is made in the form of an impeller with an angle of incidence within 25 to 55 degrees.

The problem thus posed is also solved owing to that the unit for neutralizing harmful gaseous emissions for the apparatus for cleaning exhaust gases of solid particles is made in the form of a cylindrical body comprising longitudinal channels with a catalytically active internal layer applied thereto. The longitudinal channels have therewith also a cirvilinear closed-type shape in their sross-section, and the catalytically active layer has the same thickness over the entire internal surface of the longitudinal channels, which thickness is uniform both over the cross-section of the unit and throughout the length thereof.

The problem thus posed is also solved by a method for the manufacture of the unit for neutralizing harmful gaseous emissions, in which on the carrier surface a catalytically active layer is obtained on the basis of modified alumina, said catalytically active layer being applied by flame spraying to a flat metallic band carrier. Catalytically inactive substances are used as initial material for flame spraying. Then, longitudinal channels are formed by corrugating the flat band carrier across its length, the carrier is rolled in parallel with its corrugations while placing a catalytically active layer inside the channels. Air or other mixture containing oxygen is used as a gas to form plasma during spraying.

The positive effect consists in that the invention allows not only separate solid particles (for instance, those of soot), precipitating some of them (that are of large size) and afterburning automatically the smaller particles in the catalytic unit, but also carry out the afterburning (oxidation) of soot particles to an intermediate stage: producing carbon monoxide which is an efficient reducing agent for nitrogen oxides, and this allows in the final analysis not only to clean exhaust gases of solid particles, but also to neutralize harmful gaseous emissions.

The invention allows also not only to ensure that the chemical processes of neutralizing harmful gaseous emissions proceed most completely, as enabled also by catalytic units manufactured using familiar methods, but also to manufacture such a unit that features a high adhesive strength of its catalytic layer in a streamlined and, hence, inexpensive production procedure.

Actually, flame spraying of a catalytically active layer allows to ensure interdiffusion of the carrier material under unbalanced conditions into alumina so that, as a result, there is an increase in the adhesive strength of the carrier thus produced, when it is used in engines at a temperature of up to 900° C., as well as under conditions of impacts, thermal shocks, vibration, intensive gas erosion and corrosion. In addition to this, owing to a high-rate forced application of the catalytic layer to the basic carrier—a factor which also contributes to an increase in the adhesive strength—it is ensured that a uniform coating both in its chemical composition at its thickness is thus produced, whereas if familiar methods are used, the catalytic layer is deposited on the surface of the carrier unevenly as far as its thickness and chemical composition are concerned. Together with this, in the familiar methods it is very difficult to obtain a layer of a required thickness: impregnation of the carrier by submersion or in a solution, its drying, then again submersion and so on, up to 20–30 repeated operations, which is not a good manufacturing practice since this leads to a higher labor content and, hence, to making the process too expensive. Production of a catalytically active composition on the basis of thermodynamically unbalanced alumina of γ-modification from a catalytically inactive composition, according to the invention, in a plasma jet allows to improve activity of the catalytic layer due to the fact that the active composition is formed under unbalanced conditions in the immediate vicinity of the carrier.

The method now claimed also does not require the use of metallic carriers with a high content of aluminum in a solid solution (up to 5%), which (the carriers) are not suitable for streamlined production and, hence, are expensive. In addition to this, the method now claimed does not require to carry out complicated technological operations connected with adding insoluble components, such as vanadium oxide, ceria, etc., to the carrier composition, as usually is made in order to improve catalytic activity, thermal stability and resistance to poisoning of catalysts. In the method now claimed, these components can be readily added in the form of thermally decomposable compounds to a catalytically inactive composition.

The invention now claimed allows to corrugate a coated band with a very small curvature radius, and this also allows to improve catalytic activity, whereas the prior art methods for applying a catalytic layer by deposition do not allow to apply a layer without a risk of clogging the longitudinal channels of the unit.

BRIEF DESCRIPTION OF THE DRAWING

The claimed invention will now be described in more detail with reference to the accompanying drawing which shows schematically the apparatus now claimed (in a longitudinal section view).

THE BEST EMBODIMENT OF THE INVENTION

The apparatus can be realized in the following manner. The apparatus comprises a rotational combustion chamber 1 inside which in its cylindrical portion a swirler 2 is disposed that is made in the form of an impeller with an angle of incidence of 45 degrees. In the outlet portion of the combustion chamber 1 a soot collector 3 is disposed inside which a catalytic unit 4 for neutralizing harmful emissions is coaxially arranged. The catalytic unit 4 is essentially a metallic body inside which longitudinal channels 6 are made to extend therethrough. A catalytic ceramic layer is applied to the surfaces of the channels 6. Between the swirler 2 and the soot collector 3 there is a cylindrical separating cavity 7. The combustion chamber 1 is provided with an inlet pipe 8 and an outlet pipe 9. The soot collector 3 is made of alloyed steel and "hard waste" of thin metallic wire. The unit 4 is made of high-temperature steel. The channels 6 of the unit 4 have a diameter of 1.5 to 2.0 mm their length is 90 mm, the ceramic catalytic layer of the coating is 20 to to 30 microns thick, and the free surface of the catalytic layer amounts to 50–60 m²/g.

The composition of the coating in percent by weight is as follows: copper oxide—3%, chromium oxide—2%, nickel oxide—1%, cobalt oxide—0.5%, total content of rare-earth metal oxides—1.5% the balance—alumina of gamma modification.

The apparatus with the unit 4 operates as follows. The effluent gas loaded with solid particles of soot flows to the rotational combustion chamber 1 through the inlet pipe 8 and, while passing through the swirler 2, gets swirled. In the cylindrical separating cavity 7 the solid particles are separated by weight. Heavier (larger) particles enter the peripheral region of the cavity 7, then they are trapped by the soot collector 3 and fall doom to its bottom portion, wherefrom they are periodically removed in mechanical way. Smaller particles enter the catalytic unit 4 for neutralizing harmful gaseous emissions. There, the particles pass through the longitudinal channels 6 extending therethrough and come in contact with the catalytic ceramic layer. As this takes place, carbon of the soot particles is oxidized to carbon monoxide, and this is ensured, on one hand, by the chemical and phase composition of the catalytic layer and on the other hand by that the channels 6 are long enough. The gases cleaned of solid particles are emitted through the outlet pipe 9.

Experimentally, it has been found out that making the swirler 2 to have an angle of incidence within the range of 25 to 55 degrees ensures an optimum fractional separation of the soot particles so that the catalytic unit 4 for neutralizing gaseous emissions receives the particles of only that size at which the oxidation of carbon to carbon monoxide takes place on the catalytic layer of the channels 6.

The apparatus now claimed was tested. A diesel engine was used as a source of effluent gases. As a result, it has been found out that soot particles and carbon monoxide are completely absent from exhaust gases after they pass the apparatus (in the outlet pipe 9), whereas the concentration of nitrogen oxides reduces from 40 g/kW-hr to 8 g/kW-hr.

The method now claimed can be realized, for instance, as follows. Flame spraying of a catalytically active layer has been carried out in the manufacture of catalytic units for outfitting the neutralizing system for harmful gaseous emissions from a "Tavria" car.

Spraying has been carried out in the open air with the use of plasma generator (Petrov G. K. "Properties and Characteristics of Wear-Resistant Sprayed and Heat-Treated Air-Plasma Coatings" in the book: "Gas Thermal Spraying in Industry", Saint-Petersburg, 1993, pp. 92–94). Used as a metal carrier has been foil of heat-resistant chromium-aluminum steel with the following parameters: width—90 mm, and thickness—about 40 microns. A piece of band about 5 m long has been wound in spiral around a steel drum having a diameter of 300 mm and secured to it, then spraying has been been carried out with the drum being simultaneously rotated at a speed of 60 rpm, while a carriage has been moved together with the plasma generator mounted on it long the drum axis at a rate of 180 mm/min.

The method has been also tried with the following initial composition:

aluminum—8%, aluminum hydroxide: gibbsite—33%, bemite—52%, canadium carbonate—2%, chromous carbonate—2%, nickel carbonate—1%, cobalt carbonate—0.5%, cerium carbonate 0.5%, lanthanum carbonate—0.5%, yttrium carbonate—0.5%.

Spraying conditions: voltage 220V, current 160 A plasma-forming gas (air) feed rate 3 m/s.

As a result of carrying out the spraying process, a catalytic coating has been made that has a thickness of 20 microns and the following chemical composition:

alumina of γ-modification—about 92% total of vanadium, chromous, nickel, cobalt, cerium, yttrium and lanthanum oxides—about 8%.

After spraying, the metallic band with the catalytic coating has been corrugated across the band length so that the bending radius is 1.2 mm, and the units have been rolled of them in parallel with the corrugations with the catalytically active layer facing inside the channels. The diameter of these units is 40 mm.

INDUSTRIAL APPLICABILITY

The invention may find application in automotive industry when designing internal combustion engines, including diesel engines, and namely: in systems for neutralizing harmful components of gaseous emissions. An apparatus with a neutralizing unit is advisable also to be used in modernizing an exhaust system of automotive vehicles. It can be built-in between the engine and the silencer. In this case, the apparatus now claimed can perform the functions of the silencer.

The apparatus now claimed was tested. A diesel engine was used as a source of effluent gases. As a result, it has been found out that soot particles and carbon monoxide are completely absent from exhaust gases after they pass the apparatus (in the outlet pipe 9), whereas the concentration of nitrogen oxides reduces from 40 g/kW-hr to 8 g/kW-hr.

The method now claimed can be realized, for instance, as follows Flame spraying of a catalytically active layer has been carried out in the manufacture of catalytic units for outfitting the neutralizing system for harmful gaseous emissions from a "Tavria" car.

Spraying has been carried out in the open air with the use of a plasma generator (Petrov G. K. "Properties and Characteristics: of Wear-Resistant Sprayed and Heat-Treated Air-Plasma Coatings" in the book: "Gas Thermal Spraying in Industry", Saint-Petersburg, 1993 pp. 92–94). Used as a metal carrier has been foil of heat-resistant chromium-aluminum steel with the following parameters: width—90 mm, and thickness—about 40 microns. A piece of band about 5 m long has been wound in spiral around a steel drum having a diameter of 300 mm and secured thereto then spraying has been carried out with the drum being simultaneously rotated at a speed of 60 rpm, while a carriage has been moved together with the plasma generator mounted on it along the drum axis at a rate of 180 mm/min.

The method has been tried with the following initial compositions:

Example 1.

aluminum—8%, aluminum hydroxide: gibbsite—33%, bemite—52%; vanadium carbonate—2% chromous carbonate—2% nickel carbonate 1%, cobalt carbonate—0.5%, cerium carbonate—0.5%, lanthanum carbonate—0.5%, yttrium carbonate—0.5%.

Example 2.

aluminum—5%, aluminum hydroxide (gibbsite)—90%, vanadium carbonate—1%, nickel carbonate—0.5%, nickel carbonate—0.5%, tungsten carbonate—0.5%, chromous carbonate—2.0%, lanthanum carbonate—0.5%, yttrium carbonate—0.5%.

Example 3.

Aluminum—3.0%, aluminum hydroxide (bemite)—90%, molybdenum carbonate—1.0%, cobalt carbonate—0.5%, tungsten carbonate—2.0%, vanadium carbonate—0.5%, chromous carbonate—2.0%, cerium carbonate—0.5%, yttrium carbonate—0.5%.

Example 4.

aluminum—8.0%, aluminum hydroxide (gibbsite—60%, bemite—25%)—85%, manganese carbonate—2.0%, ferrous carbonate—2.0%, chromous carbonate—1.0%, vanadium carbonate—1.0%, cerium carbonate—0.5%, yttrium carbonate—0.5%.

Spraying conditions: voltage 220V, current 160 A, plasma-forming gas (air) flow rate 3 m/s. The catalytic activity increases substantially with complex introduction of carbonates, and it is their total ratio to all other components that is of critical importance. Incidentally, in the above-mentioned group per se there can be any ratio of components, i.e., the proportion in which the carbonates of vanadium, chromium, manganese, iron, cobalt, nickel, niobium, molybdenum, etc., of lanthanoid and yttrium is not subject to strict limitation.

We claim:

1. An apparatus for cleaning exhaust gases of solid particles, said apparatus comprising a rotational combustion chamber with a catalytic unit arranged therein, said apparatus further comprising a swirler and a soot collector separated from one another by a cylindrical separating cavity and located on the same axis downstream the gas flow, and the catalytic unit for neutralizing harmful gaseous emissions is arranged coaxially inside the soot collector wherein the swirler is made in the form of an impeller with an angle of incidence within 25 to 55 degrees.

2. The apparatus according to claim 1, Wherein said catalytic unit is made in the form of a cylindrical body comprising longitudinal channels with a catalytically active internal layer, characterized in that said longitudinal channels are enclosed and are defined by curvilinear boundaries in the cross-section thereof, and the catalytically active layer has the same thickness over the entire internal surface of said longitudinal channels, which thickness is uniform both over the cross-section of the unit and throughout the length thereof.

3. The catalytic unit according to claim 2, wherein said catalytic unit is manufactured by a method comprising in obtaining a catalytically active layer on a carrier surface, said layer comprising basically of modified alumina, characterized in that said catalytically active layer is applied by flame spraying to a flat metallic band carrier, wherein catalytically inactive substances are used as initial material for flame spraying, then longitudinal channels are formed by corrugating the flat band carriers across the length thereof, the carrier is rolled in parallel with the corrugations thereof while placing said catalytically active layer inside the channels, whereas air or other mixture containing oxygen is used as a gas to form a plasma during spraying.

* * * * *